United States Patent
Hands et al.

(10) Patent No.: US 10,358,056 B1
(45) Date of Patent: Jul. 23, 2019

(54) INFANT TRAVEL SWADDLE

(71) Applicants: Jennifer Renee Hands, Tulsa, OK (US); Roderick Burton Hands, Tulsa, OK (US)

(72) Inventors: Jennifer Renee Hands, Tulsa, OK (US); Roderick Burton Hands, Tulsa, OK (US)

( * ) Notice: Subject to any disclaimer, the term of this patent is extended or adjusted under 35 U.S.C. 154(b) by 251 days.

(21) Appl. No.: 15/658,501

(22) Filed: Jul. 25, 2017

Related U.S. Application Data

(60) Provisional application No. 62/366,600, filed on Jul. 25, 2016.

(51) Int. Cl.
*A41B 13/06* (2006.01)
*A47D 15/00* (2006.01)
*A47D 13/02* (2006.01)
*B60N 2/28* (2006.01)

(52) U.S. Cl.
CPC ............ *B60N 2/2812* (2013.01); *A41B 13/06* (2013.01); *A47D 15/006* (2013.01); *A47D 13/025* (2013.01)

(58) Field of Classification Search
CPC ........ A41B 13/06; A41B 13/065; A47D 5/00; A47D 5/006; A47D 13/08; A47D 13/083; A47D 15/00; A47D 15/005; A47D 15/006; A47D 15/008; A47D 13/02; A47D 13/025; A47G 9/08; A47G 9/083
USPC ...... 5/494, 482, 655, 413 R, 922, 923; 2/69, 2/69.5; 224/158
See application file for complete search history.

(56) References Cited

U.S. PATENT DOCUMENTS

| | | | | |
|---|---|---|---|---|
| 2,628,358 A | * | 2/1953 | Neils | A47D 13/02 2/69.5 |
| 2,804,249 A | * | 8/1957 | Manalo | A47D 13/02 224/158 |
| 4,717,056 A | * | 1/1988 | Carmichael | A47D 13/02 2/69.5 |
| 4,802,244 A | * | 2/1989 | McGrath-Saleh | A41B 13/06 2/69 |
| 5,333,769 A | * | 8/1994 | Skroski | A47D 5/006 224/148.5 |
| 5,551,109 A | * | 9/1996 | Tingley | A47D 13/02 128/870 |
| 5,606,744 A | * | 3/1997 | Lindy | A47D 15/00 128/857 |
| 5,722,094 A | | 3/1998 | Ruefer | |
| 5,772,088 A | * | 6/1998 | Nelson | A47D 13/025 224/158 |
| 6,817,033 B2 | | 11/2004 | Bailey | |

(Continued)

FOREIGN PATENT DOCUMENTS

CN 2188284 2/1995

*Primary Examiner* — Robert G Santos
(74) *Attorney, Agent, or Firm* — Dennis D. Brown; Brown Patent Law, P.L.L.C.

(57) ABSTRACT

An infant travel swaddle which can be wrapped around the torso and arms of an infant while the infant remains seated in a car seat or stroller. The travel swaddle has a stiff central portion, which resists bunching, and a pair of wing wraps which extend from the left and right sides of the central portion. When the infant is seated in a car seat or stroller, the central portion will be positioned between the infant's back and back rest of the car seat or stroller. When the wing wraps are wrapped over the infant's torso and arms, a leg covering can also be removably attached to the swaddle.

5 Claims, 5 Drawing Sheets

(56) References Cited

U.S. PATENT DOCUMENTS

| | | | | |
|---|---|---|---|---|
| 8,539,620 B1 * | 9/2013 | Wynh | A41B 13/06 | 5/413 R |
| 8,650,685 B1 * | 2/2014 | Ford | A41B 13/06 | 2/69 |
| 8,667,631 B2 * | 3/2014 | Coates | A41B 13/06 | 2/69.5 |
| 8,671,486 B1 | 3/2014 | Paperno | | |
| 8,776,265 B2 | 7/2014 | Neveu | | |
| 8,782,831 B2 | 7/2014 | Houston et al. | | |
| 8,898,833 B2 * | 12/2014 | Coates | A41B 13/06 | 2/69.5 |
| 8,938,830 B2 * | 1/2015 | Paperno | A41B 13/06 | 5/655 |
| 9,066,609 B2 * | 6/2015 | Starr | A47D 13/02 | |
| 9,226,528 B2 * | 1/2016 | Sedivy | A41B 13/06 | |
| 9,237,771 B2 * | 1/2016 | Paperno | A47G 9/083 | |
| 9,504,616 B2 * | 11/2016 | Belsinger, Jr. | A61B 8/06 | |
| 9,839,563 B2 * | 12/2017 | Belsinger, Jr. | A61B 8/06 | |
| 10,052,029 B2 * | 8/2018 | Belsinger, Jr. | A61B 5/01 | |
| 10,206,807 B2 * | 2/2019 | Starr | A47D 13/02 | |
| 2010/0299801 A1 | 12/2010 | Nilsson | | |
| 2011/0197364 A1 | 8/2011 | Wadia | | |
| 2011/0197365 A1 * | 8/2011 | Wadia | A47D 13/02 | 5/655 |
| 2013/0340770 A1 * | 12/2013 | Starr | A47D 13/02 | 128/870 |
| 2014/0020176 A1 * | 1/2014 | Coates | A41B 13/06 | 5/494 |
| 2014/0020177 A1 * | 1/2014 | Coates | A41B 13/06 | 5/494 |
| 2014/0250595 A1 * | 9/2014 | Paperno | A41B 13/06 | 5/421 |
| 2014/0298587 A1 * | 10/2014 | Sedivy | A41B 13/06 | 5/655 |
| 2015/0128350 A1 * | 5/2015 | Paperno | A47G 9/083 | 5/655 |
| 2015/0257919 A1 * | 9/2015 | Starr | A47D 13/02 | 128/870 |
| 2016/0073889 A1 * | 3/2016 | Belsinger, Jr. | A61B 5/01 | 600/549 |
| 2016/0074260 A1 * | 3/2016 | Belsinger, Jr. | A61B 8/06 | 600/509 |
| 2016/0113331 A1 | 4/2016 | Blacker | | |
| 2016/0362024 A1 | 12/2016 | Simon et al. | | |
| 2017/0035629 A1 * | 2/2017 | Belsinger, Jr. | A61B 8/06 | |

* cited by examiner

INFANT TRAVEL SWADDLE

RELATED CASE

This application claims the benefit of U.S. Provisional Patent Application Ser. No. 62/366,600 filed on Jul. 25, 2016 and incorporates said provisional application by reference into this document as if fully set out at this point.

FIELD OF THE INVENTION

An infant travel swaddle designed specifically for a car seat or stroller.

BACKGROUND OF THE INVENTION

Baby swaddling is something that helps infants feel safe and secure. Swaddling can also help a baby to stay asleep because it prevents a baby from startling and awakening oneself with his or her flailing arms. When sleeping in a car seat or stroller, sudden bumps or stops can cause a baby's arms to flail, which inevitably leads to an unhappy baby that is awake and crying.

There are many companies designing and distributing baby swaddles to meet the needs of a sleeping babe. Many that cover the feet, some that wrap only around the waist, but very few that are designed specifically for a car seat. Of the ones that are designed for a car seat, they seem to all cover the body and feet of the baby. This is a drawback because it prevents a parent from being able to remove the swaddle without unbuckling the baby. If taking a long road trip, a parent may want to slide the swaddle out of the carseat once the baby is done napping.

Another drawback of a full body car seat swaddle is that it can cause a baby to overheat. It is much easier for a parent to add or remove a blanket rather than have to pull over the car and unbuckle the infant to remove the swaddle. And by removing a swaddle from an infant that feels hot, a parent would inevitably wake the child. The ability to add or remove a blanket makes the swaddle more versatile for indoors, outdoors, summer and winter and also prevents waking the child.

Lastly, the full body car seat swaddle can be uncomfortable for the baby because it does not allow a full range of motion for the baby's legs. When a baby is strapped in a car seat, the buckle is resting between the two legs. Therefore, the baby needs to be able to keep the legs comfortably relaxed rather than pushed together.

After reviewing prior art, it is evident that a need exists in the field for an infant travel swaddle that wraps solely around a baby's torso and arms. With our design, the need for a swaddle that can be removed without unstrapping a baby from a car seat, as well as one that is versatile for differing temperatures, will be alleviated. Lastly, there is a need for a swaddle that is specifically designed for a car seat, with the back fitting perfectly in between the car seat base and straps, and for the design to not allow the swaddle to bunch or slide down. Our design meets that need.

SUMMARY OF THE INVENTION

The present invention embodies an infant travel swaddle 11 designed specifically for a car seat or stroller. The travel swaddle 11 comprises a structured base 3 in the center of the swaddle. The structured base 3 eliminates the possibility of the swaddle falling down or bunching behind the baby's back. The structured base 3 also protects the baby from the swaddle rising up over the baby's face when the car seat straps 16 and 18 are placed on the baby correctly. In the preferred embodiment, the left wing 1 is tipped 7 to provide for easing wrapping and tucking around the baby's torso and the right wing 2 folds over on top of the left wing 1 to connect the two together.

In one aspect, there is provided an infant travel swaddle for a car seat or stroller wherein the infant travel swaddle preferably comprises a stiff central portion which resists bunching and has a width corresponding to a height of an infant's back extending approximately from a top of the infant's hips to an area of connection of the infant's arms to the infant's torso below a top of the infant's shoulders so that, when the infant is positioned in the car seat or stroller with a pair of chest straps of a harness of the car seat or stroller extending from the back rest of the car seat or stroller over the infant's shoulders and chest and a buckle of the harness buckled between the infant's legs, the stiff central portion will be positioned between the infant's back and the back rest of the car seat.

The infant travel swaddle also preferably comprises a first wing wrap extending from a first lateral side of the stiff central portion, the first wing wrap having a width corresponding to a height of the infant's torso extending approximately from the top of the infant's hips to the area of connection of the infant's arms to the infant's torso below the top of the infant's shoulders so that, when the infant is positioned in the car seat or stroller, the first wing wrap can be placed in a wrapped position of the first wing wrap across a front of the infant's torso over the infant's chest and arms and over the chest straps of the harness of the car seat or stroller.

The infant travel swaddle further preferably comprises a second wing wrap extending from a second lateral side of the stiff central portion, the second wing wrap having a width corresponding to the height of the infant's torso extending approximately from the top of the infant's hips to the area of connection of the infant's arms to the infant's torso below the top of the infant's shoulders so that, when the infant is positioned in the car seat or stroller, the second wing wrap can be placed in a wrapped position of the second wing wrap across the front of the infant's torso and over the first wing wrap.

In addition, the infant travel swaddle also preferably comprises an attachment device or system provided on the second wing wrap, the first wing wrap, or both which removably secures the second wing wrap in the wrapped position of the second wing wrap over the first wing wrap so that the first and second wing wraps can be released and unwrapped from across the front of the infant's torso without releasing the harness and without removing the infant from the car seat or stroller.

Also in addition to the above, the inventive infant travel swaddle can optionally be further configured or characterized so that: the width of stiff central portion is less than the width of the first wing wrap and is less than the width of the second wing wrap; the first wing wrap has an extended distal tip portion for tucking the first wing wrap around an opposite side of the infant's torso within the second wing wrap; and/or the attachment device or system is a hook and loop attachment system.

In another embodiment, the travel swaddle may also have a fastening system on it to allow for the optional leg attachment 20 to be fastened to the bottom. The leg attachment 20 will provide the ability for a parent to add or remove something to cover the baby's legs and feet without awakening the baby or removing the swaddle from the baby.

Further aspects, features and advantages of the present invention will be apparent to those in the art upon examining the accompanying drawings and upon reading the following Detailed Description of the Preferred Embodiments.

BRIEF DESCRIPTION OF THE DRAWINGS

Some embodiments of the invention are illustrated below as an example but are not to be used to limit alternative embodiments of the invention in which similar elements or alternative references may be used. In the figure, numbers are used as reference.

DETAILED DESCRIPTION OF THE PREFERRED EMBODIMENTS

The terminology used is solely for the purpose of describing particular embodiments and is not intended by nature to be limiting of the invention.

Figure 1:
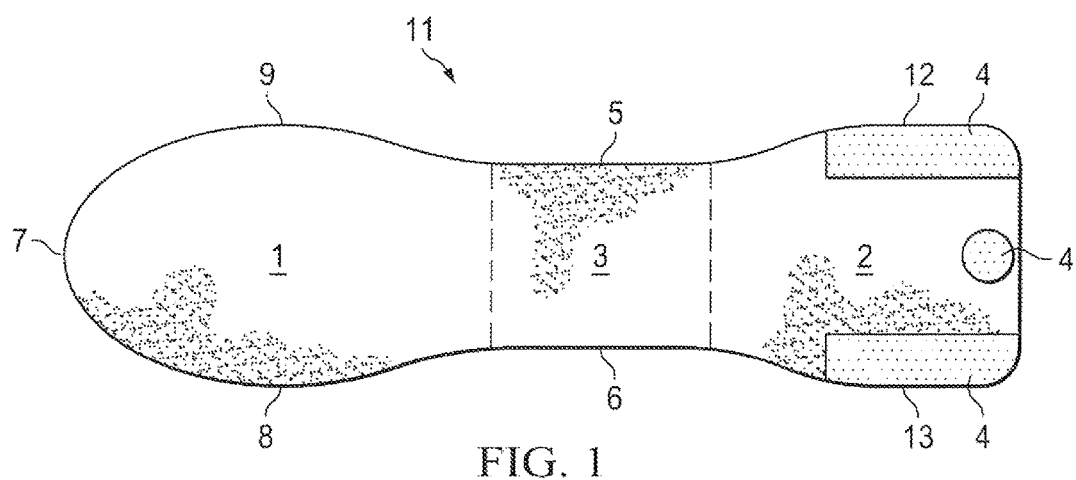
FIG. 1 illustrates an inside view of an embodiment of the infant travel swaddle 11 in which the left and right wings 1 and 2 are not secured together.

To secure the travel swaddle 11 to the baby, one or more connections need to be made. The left wing 1 and right wing 2 need to be fastened and a hook and loop fastening system can be used to accomplish this. In FIG. 1, the outer left wing 7 functions as the loop fastening system and the inner right wing tip 4 functions as the hook fastening system. The loop fastening system may encompass the entire area of the left wing 1, to allow adjustability for different size babies. In alternative embodiments, the right wing 2 may function as the loop fastening system and the left wing 1 may function as the hook fastening system. Other attachments may be used to replace, or in conjunction with the hook and loop fastening system, such as buttons, snaps, zippers as well as other fastening systems.

Figure 3:
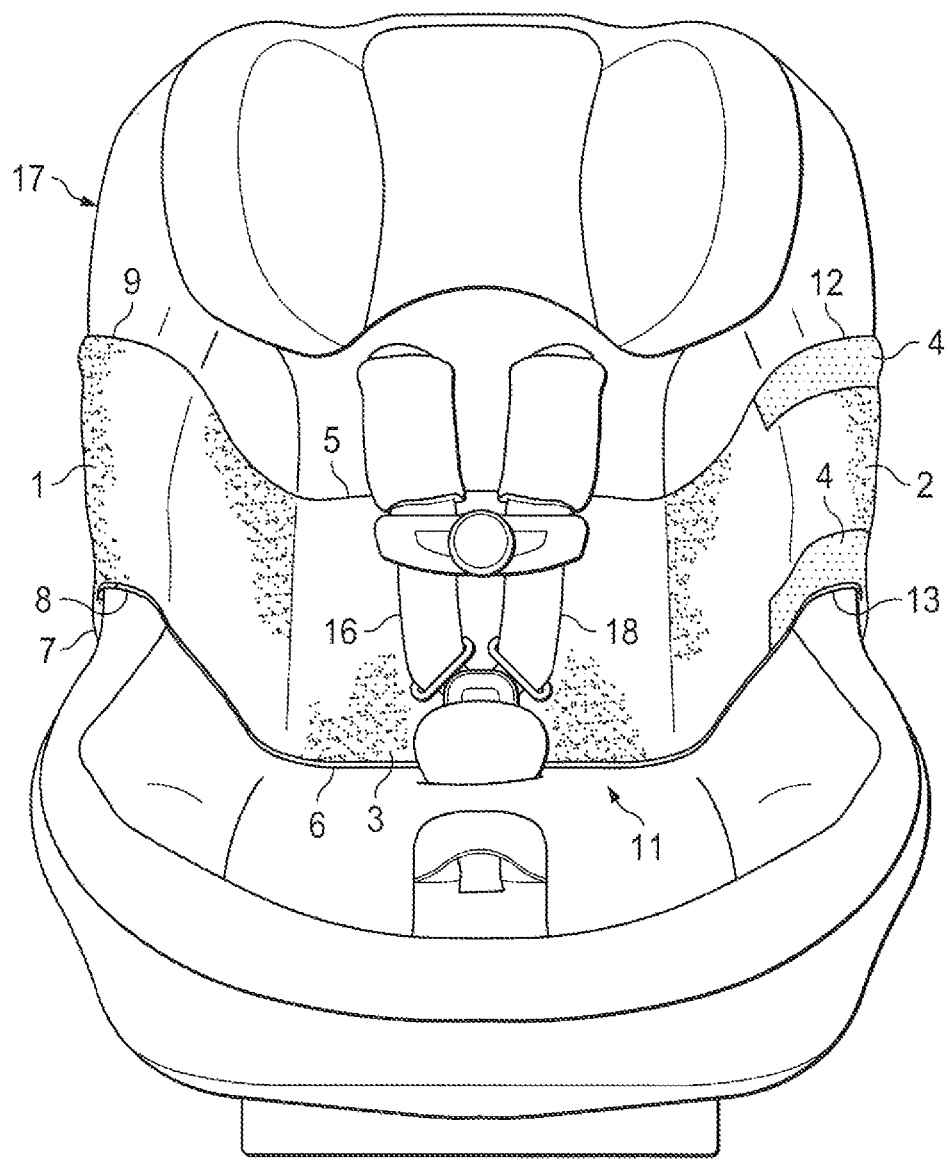
FIG. 3 illustrates an inside view of an embodiment of the infant travel swaddle 11 in which the center base 3 is properly placed below the harness straps 16 and 18 and the left and right wing 1 and 2 are not secured together.

As seen in FIG. 3, the center base 3 is designed to fit under the two chest straps 16 and 18 on a car seat or stroller 17. The size of the center base 3 may be adjusted to be bigger or smaller. The center base 3 is designed to go behind the baby's back while the baby is strapped in the car set or stroller. The center base 3 is constructed of stiff material to help prevent the swaddle 11 from sliding up or down. The stiff material in center base 3 may or may not be able to be removed from the swaddle 11.

Figure 2:
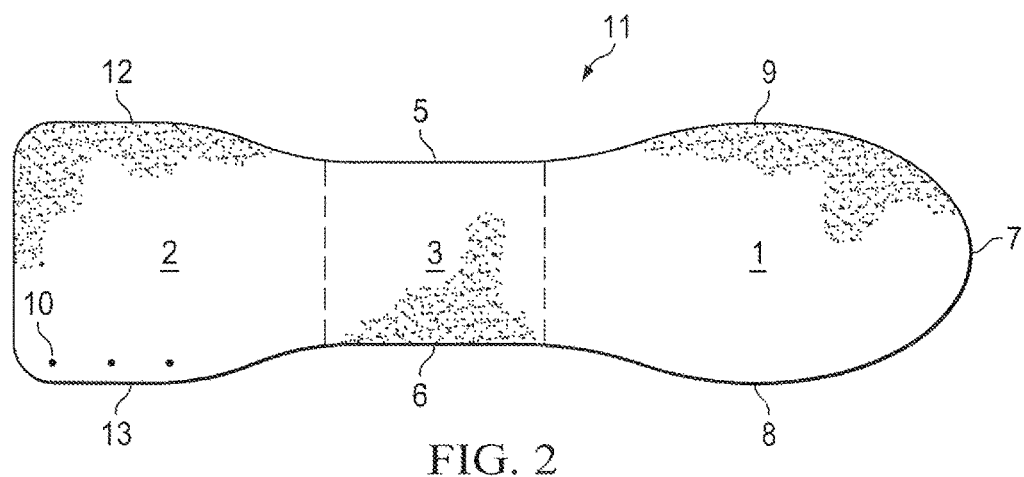
FIG. 2 illustrates an outside view of an embodiment of the infant travel swaddle 11 in which the left and right wings 1 and 2 are not secured together.
Figure 4:
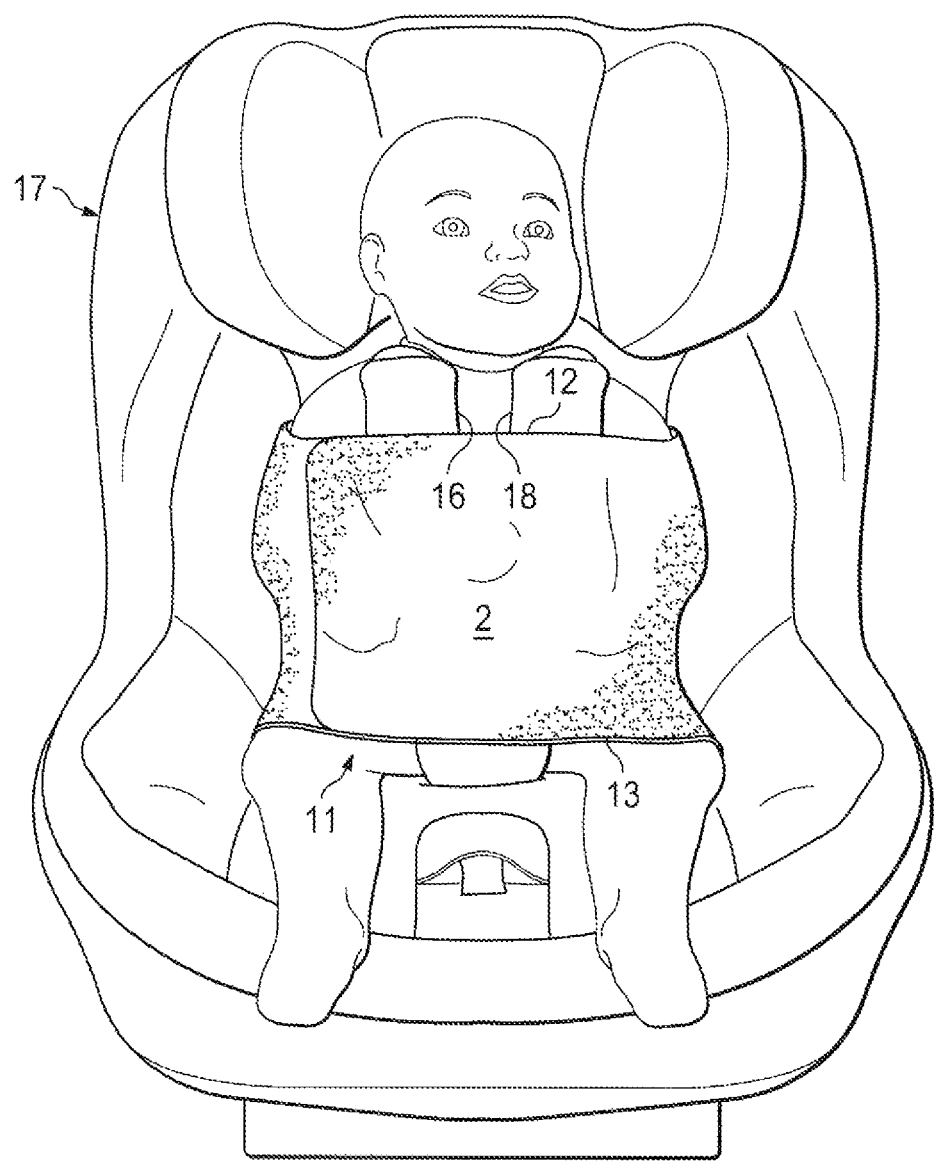
FIG. 4 illustrates a front view of an embodiment of the infant travel swaddle 11 in which the left and right wings 1 and 2 are secured together around the arms of the baby.
Figure 5:
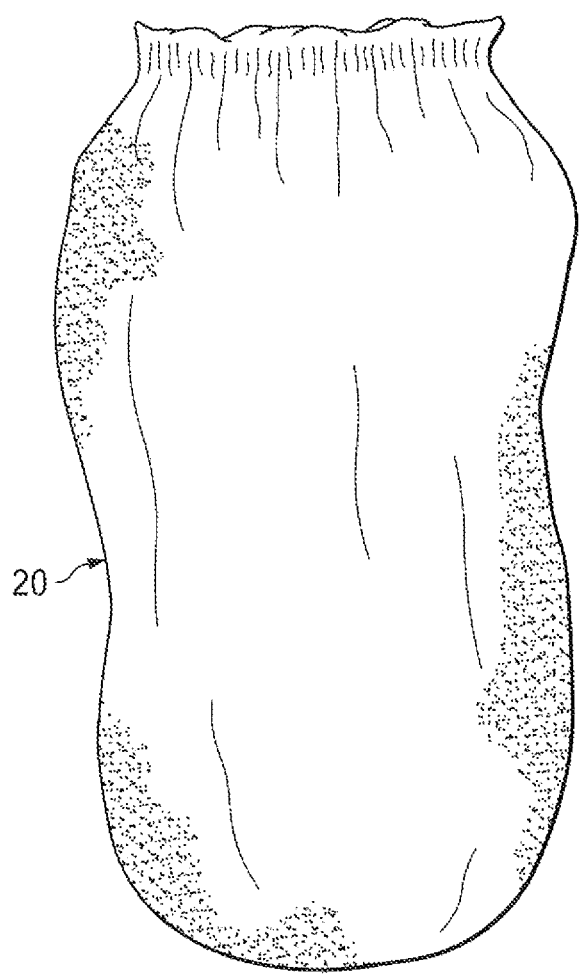
FIG. 5 illustrates a front view of an embodiment of the leg attachment 20 that can be fastened to the infant travel swaddle 11.

Once the center base 3 of the travel swaddle 11 is placed behind the baby's back, the baby must be strapped into the car seat or stroller 17. After being fully strapped in, the left wing 1 and right wing 2 are secured around the baby's arms and fastened together, as shown in FIG. 4. As shown in FIGS. 1, 2, and 3, the travel swaddle 11 may include various edges. When fastened together around the baby, the left wing top edge 9 is aligned with, and underneath, the right wing top edge 12 and the left wing bottom edge 8 is aligned with, and underneath, the right wing bottom edge 13. As shown in FIG. 4, when the travel swaddle 11 is secured to the baby, the left wing top edge 9 and right wing top edge 12 are aligned slightly below the baby's shoulders, and the left wing bottom edge 8 and right wing bottom edge 13 are aligned with the baby's lower arms and hip.

Figure 6:
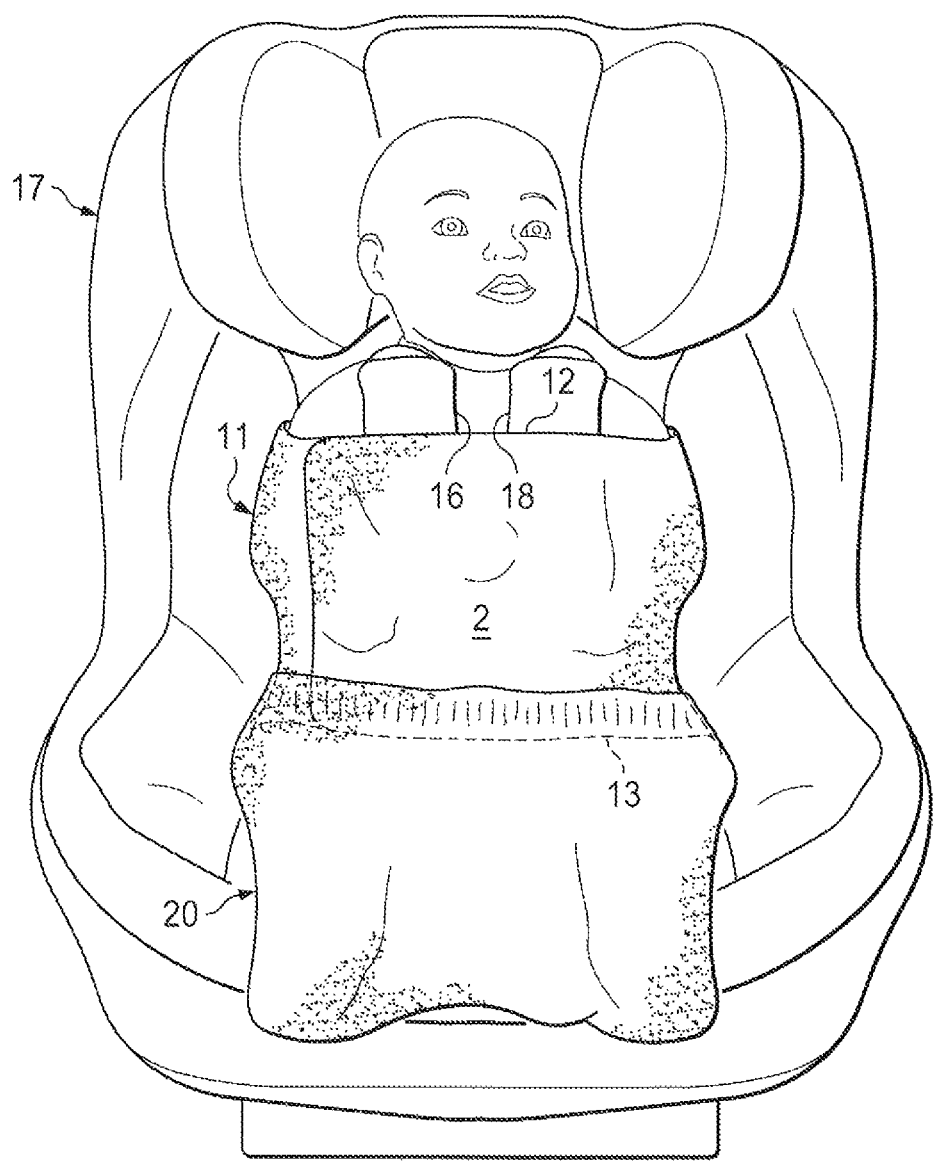
FIG. 6 illustrates a front view of an embodiment of the infant travel swaddle 11 in which the left and right wings 1 and 2 are secured together around the arms of the baby and the leg attachment 20 is fastened to the travel swaddle 11 to cover the feet.

Since the travel swaddle 11 edges wrap around the upper torso and not the legs, as seen in FIG. 4, the travel swaddle 11 is able to be unfastened and removed from the car seat 17 without unstrapping and removing the baby from the car seat 17. This design also decreases the chance of the baby overheating because the legs are left uncovered unless the optional leg attachment 20 is used. As seen in FIG. 6, a leg attachment 20 may be fastened to the travel swaddle 11 to provide warmth or security for the baby.

The invention has been described by way of example only and is not intended to be used by way of limitation. Different variations as well as modifications may be made as they fall within the scope of the invention.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. An infant travel swaddle for a car seat or stroller, the infant travel swaddle comprising:
   a stiff central portion which resists bunching and has a width configured to correspond to a height of an infant's back extending approximately from a top of the infant's hips to an area of connection of the infant's arms to the infant's torso below a top of the infant's shoulders so that, when the infant is positioned in the car seat or stroller with a pair of chest straps of a harness of the car seat or stroller extending from a back rest of the car seat or stroller over the infant's shoulders and chest and a buckle of the harness is buckled between the infant's legs, the stiff central portion will be positioned between the infant's back and the back rest of the car seat or stroller;
   a first wing wrap extending from a first lateral side of the stiff central portion, the first wing wrap having a width configured to correspond to a height of the infant's torso extending approximately from the top of the infant's hips to the area of connection of the infant's arms to the infant's torso below the top of the infant's shoulders so that, when the infant is positioned in the car seat or stroller, the first wing wrap can be placed in a wrapped position of the first wing wrap across a front of the infant's torso over the infant's chest and arms and over the chest straps of the harness of the car seat or stroller;
   a second wing wrap extending from a second lateral side of the stiff central portion, the second wing wrap having a width configured to correspond to the height of the infant's torso extending approximately from the top of the infant's hips to the area of connection of the infant's arms to the infant's torso below the top of the infant's shoulders so that, when the infant is positioned in the car seat or stroller, the second wing wrap can be placed in a wrapped position of the second wing wrap across the front of the infant's torso and over the first wing wrap; and an attachment device or system provided on the second wing wrap, the first wing wrap, or both which removably secures the second wing wrap in the wrapped position of the second wing wrap over the first wing wrap so that the first and second wing wraps can be released and unwrapped from across the front of the infant's torso without releasing the harness and without removing the infant from the car seat or stroller.

2. The infant travel swaddle of claim 1 wherein the width of the stiff central portion is less than the width of the first wing wrap and is less than the width of the second wing wrap.

3. The infant travel swaddle of claim 1 wherein the first wing wrap has an extended distal tip portion for tucking the first wing wrap around an opposite side of the infant's torso within the second wing wrap.

4. The infant travel swaddle of claim 1 wherein the attachment device or system is a hook and loop attachment system.

5. The infant travel swaddle of claim 1 further comprising a leg covering for the infant which is removably attachable to the infant travel swaddle when the infant is positioned in the car seat or stroller and the first and second wing wraps are secured in their wrapped positions.

* * * * *